Patented Oct. 20, 1925.

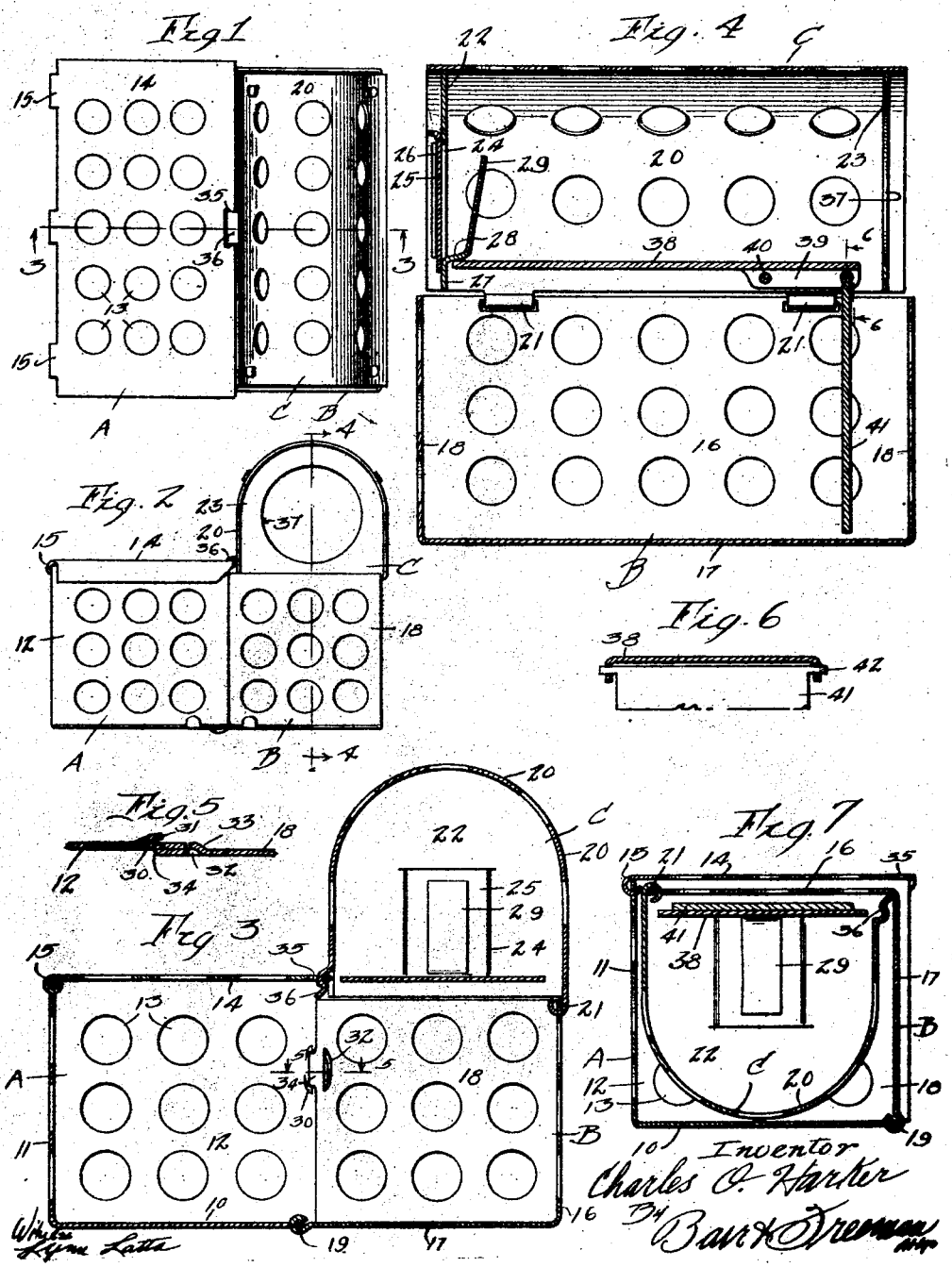

1,557,933

UNITED STATES PATENT OFFICE.

CHARLES O. HARKER, OF GRAND JUNCTION, IOWA.

ANIMAL TRAP.

Application filed September 6, 1923. Serial No. 661,192.

*To all whom it may concern:*

Be it known that I, CHARLES O. HARKER, a citizen of the United States, residing at Grand Junction, in the county of Greene and State of Iowa, have invented a certain new and useful Animal Trap, of which the following is a specification.

My invention relates to animal traps of the self-setting type which can be closed or telescoped into relative small space for storage or transportation, and may be expanded or have its parts rigidly connected together in position for serving as a trap.

More particularly, it is my object to provide an animal trap comprised of sections so built and arranged that they may be folded or collapsed so that small sections will be received in one larger section in compact form, or the sections may be expanded and held in position for serving as a trap.

With these and other objects in view, my invention consists in the construction, arrangement and combination of the various parts of my device, whereby the objects contemplated are attained as hereinafter more fully set forth, pointed out in my claims, and illustrated in the accompanying drawings, in which:

Figure 1 shows a top or plan view of my improved trap in position for use.

Figure 2 shows an end view of the same.

Figure 3 shows a transverse sectional view taken on the line 3—3 of Figure 1.

Figure 4 shows a longitudinal, sectional view taken on the line 4—4 of Figure 2.

Figure 5 shows a detailed, sectional view taken on the line 5—5 of Figure 3.

Figure 6 is a detailed, sectional view taken on the line 6—6 of Figure 4; and

Figure 7 is a transverse, sectional view of the trap in its collapsed position.

It will be understood that my improved trap may be made in a variety of forms for accomplishing the purpose of my invention and the drawings and description shown and given herein are for the purpose of illustrating a particular form in which the invention may be embodied, and are not intended to limit my patent to the particular form shown.

In the particular form in which my invention is illustrated in the accompanying drawings, I have shown a plurality of trap sections so connected together as to permit the expansion or collapsing heretofore referred to.

In the drawings I have used the reference character A to indicate generally the section which consists of the bottom member 10, the front wall 11, and the end walls 12.

Rigidly connected together and preferably made from a single blank, these members are all provided with perforations or openings 13 of some kind.

A perforated cover 14 is pivoted or hinged, as at 15, to the upper edge of the front wall 11 of the section or unit A. A second section or unit, indicated generally by the reference character B, comprising a back wall 16, a bottom 17, and end walls 18, are rigidly connected together.

The front edge of the bottom 17 is hinged or pivoted, as at 19, to the rear edge of the bottom 10.

The section B is slightly shorter and narrower than the section A and is not quite so high as the section A to permit the section B to be folded or collapsed into the section A, as illustrated in Figure 7.

A third section C comprises a downwardly opening channel shaped member 20 having one wall hinged, as at 21, to the upper edge of the wall 16, as shown in Figure 3.

The section C has the ends 22 and 23 illustrated best in Figure 4. The section C is of such size as to fold or collapse into the section B.

The end 22 of the section C has an opening 24 for which there is provided a slidable door or closure member 25 slidably mounted in the guides 26 on the inner sides of the member 20.

Secured to the member 20, at its upper end, adjacent to the end 22 is the bait holder 27 having a portion 28 projecting into the section C at the lower part of the opening 24, as shown in Figure 4 and thence upwardly, as at 29.

The slidable closure member 25 and the opening 24 permit convenient access to the bait holder 29.

Means are provided for rigidly connecting the various sections together with the sections B side by side and the section C superposed over the section B, as shown in Figure 3 where the parts are illustrated for use in a trap.

The means utilized for this purpose may vary but for purpose of illustration, I have shown the ends 12 of the section A provided with slots 30 formed by cutting tongues 31 from the ends 12 and pressing them outwardly as shown in Figure 5.

Ends 18 of the section B are provided with slots 32 formed by cutting and pressing tongues 33 therefrom.

The ends 18 are also provided in line with the slots 32 with tongues 34 inclined outwardly away from the ends 18, as shown in Figure 5. The parts are of resilient material so that the ends 18 may be sprung inwardly to permit the outwardly projecting portions of the tongues 34 to clear the edges of the ends 12 until said outwardly projecting portions register with and enter the slots 30.

I have shown for illustration and as a possible means for rigidly connecting the section C with the section A, a slot 35 in the cover member 14 and a spring catch member 36 of ordinary construction on the member 20 of the section C for entering said slot 35, as illustrated in Figures 1 and 3.

The end 23 of the section C is provided with a large ingress opening 37 for animals such as mice, rats or the like.

Pivoted between the walls of the member 20 is a tilting trap door or platform 38 having at its side edges the downwardly projecting flanges 39 provided with openings to receive the transverse shaft 40, the ends of which are mounted in the walls of the member 20.

The platform or trap door 38 tilts on the shaft 40, its longer end being extended toward the end 22 of the section C.

The portion 28 of the bait holder is so arranged as shown in Figure 4 as to limit the upward movement of the trap door or tilting floor or platform 38 as shown in Figure 4.

On the opposite side of the pivot line of the platform 38 there is pivoted to the flanges 39 a downwardly hinged plate 41 having the pintles 42 pivoted in the flanges 39, as shown in Figure 6.

The plate 41 serves as a counter balance for the platform 38 and also to close the opening 37 when the platform 38 is tilted for causing the animal to be dropped into section B of the trap.

In the particular use of my improved trap, sections are rigidly connected together in the manner heretofore described for forming a trap as illustrated in Figures 1, 2, 3, and 4, in which the sections A and B are arranged side by side and the section C is superposed on the section B.

Bait such as a piece of cheese may be placed on the holder 29 by raising the closure member 25 and inserting the bait through the opening 24.

When an animal, such as a mouse, enters through the opening 37, it may walk on the platform 38 toward the bait until it passes over the pivot line along the shaft 40 whereupon the platform 38 will suddenly drop precipitating the mouse into the section B. When the platform thus tilts, the plate 41 is raised for closing the opening 37 and as soon as the animal slides or steps off the platform 38, the plate 41 serves as a counterweight to raise the platform 38 to its normal position.

When it is desired to collapse the trap for storage or transportation in compact form, the section C is swung on its hinge for withdrawing the spring catches 36 from the slots 35. The ends of the section B will spring inwardly to withdraw the outwardly projecting portions of the tongues 34 from the slots 30.

The cover 14 is swung upwardly and away from the sections C and B. The section C is swung into the section A, all as illustrated in Figure 7, whereupon the cover 14 may be swung back to its position where it is above the collapsed sections B and C.

It will be seen that the entire trap is folded or telescoped into one section.

It is my purpose to build my trap in any convenient form which will permit of the complete collapsing as herein generally described and which will permit the parts to be rigidly connected together in form for use as a trap when expanded.

I, therefore, do not desire to limit myself to the particular form herein shown, but cover by my claims, any modified form of structure or mechanical equivalent which may be reasonably included within their scope.

For example, a spring or springs might be substituted for the counterweight plate 41.

I claim as my invention:

1. In an animal trap, upper and lower portions, means for pivotally connecting them together for permitting the upper portion to be swung into the lower portion, a trap door pivotally mounted in the upper portion having a counter weight pivotally supported thereon, and normally hanging into the lower portion, said counterweight being adapted to be swung to position adjacent to the trap door when the trap portions are collapsed.

2. In an animal trap, a plurality of sections, connected together for expansion or collapsing, means for rigidly securing the sections in expanded position with one above another, and with the lower sections side by side and communicating with each other, said upper section having a trap door structure therein.

3. In an animal trap, a plurality of sections connected together for collapsing the sections into one section or for expanding them to form a trap in which two sections are located side by side opening into each other, and another section is superposed upon one of the first two sections.

4. In a self-setting animal trap, a plurality of sections connected together for expansion or for collapsing into one section, and means for rigidly securing the sections in expanded position, one of said sections having an ingress opening at one end and a bait holder at the other end, a trap door having at one end a pivoted plate serving as a counterweight and adapted to close the ingress opening when the trap door is closed, said bait holder serving to limit the movement of the trap door in one direction.

5. In an animal trap, a plurality of sections connected together for expansion or collapsing, one of said sections having an ingress opening at one end and a bait holder at the other end, a trap door pivotally mounted in said last mentioned section, said trap door having at one end a pivoted plate serving as a counter weight and adapted to close the ingress opening when the trap door is closed, said bait holder serving to limit the movement of the trap door in one direction.

6. In an animal trap, a plurality of sections successively connected together for collapsing or expanding movement, two of said sections being adapted to stand side by side and another of said sections being adapted to be superposed on one of the first two, means for locking the first two sections together and means for locking the third of said sections to that section over which it is not superposed.

7. In an animal trap, a pair of lower sections arranged side by side and hinged together along their edge, an upper section hinged to the outer upper edge of one of the lower sections, the other of the lower sections having a hinged top member adapted to be locked to the upper section when the parts are in their expanded position, the parts being so arranged that the upper section may be swung to one of the lower sections and said one of the lower sections may then be swung into the other of the lower sections.

Des Moines, Iowa, August 20, 1923.

CHARLES O. HARKER.